United States Patent
Sakamoto et al.

(10) Patent No.: US 11,886,004 B2
(45) Date of Patent: Jan. 30, 2024

(54) PLANER LIGHTWAVE CIRCUIT

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 40 days.

(21) Appl. No.: 17/624,796

(22) PCT Filed: Jul. 9, 2019

(86) PCT No.: PCT/JP2019/027197
§ 371 (c)(1),
(2) Date: Jan. 4, 2022

(87) PCT Pub. No.: WO2021/005726
PCT Pub. Date: Jan. 14, 2021

(65) Prior Publication Data
US 2022/0260780 A1    Aug. 18, 2022

(51) Int. Cl.
*G02B 6/12* (2006.01)
*G02B 6/125* (2006.01)

(52) U.S. Cl.
CPC ......... *G02B 6/12014* (2013.01); *G02B 6/125* (2013.01); *G02B 2006/12038* (2013.01); *G02B 2006/12147* (2013.01)

(58) Field of Classification Search
CPC ............... G02B 6/12014; G02B 6/125; G02B 2006/12038; G02B 2006/12147
See application file for complete search history.

(56) References Cited

U.S. PATENT DOCUMENTS 6,304,687 B1   10/2001   Inoue et al.
2016/0170156 A1*  6/2016   Oguro .................. G02B 6/125
                                                      385/14

FOREIGN PATENT DOCUMENTS

| JP | 2003-149478 A | 5/2003 |
| JP | 2014-167567 A | 9/2014 |
| JP | 2017-146543 A | 8/2017 |
| WO | 2015/008451 A1 | 1/2015 |

OTHER PUBLICATIONS

Akira Nakao et al., *Integrated Waveguide-Type Red-Green-Blue Beam Combiners for Compact Projection-Type Displays*, Optics Communications, vol. 330, 2014, pp. 45-48.
Yoshinori Hibino et al., *An Array of Photonic Filtering Advantages: Arrayed-Waveguide-Grating Multi/Demultiplexers for Photonic Networks*, IEEE Circuits & Devices, Nov. 2000, pp. 21-27.
Akira Himeno et al., *Silica-Based Planar Lightwave Circuits*, IEEE Journal of Selected Topics in Quantum Electronics, vol. 4, No. 6, 1998, pp. 913-924.

* cited by examiner

*Primary Examiner* — John Bedtelyon
(74) *Attorney, Agent, or Firm* — Workman Nydegger

(57) ABSTRACT

Provided is a planar lightwave circuit in which stress on a substrate is reduced to decrease the curve of the substrate. The planar lightwave circuit is formed by layering a glass film on the substrate. When the optical axis direction from an input waveguide toward an output waveguide is in the longitudinal direction of the substrate, a plurality of grooves are formed in a line in the transverse direction of the substrate.

7 Claims, 5 Drawing Sheets

PLANER LIGHTWAVE CIRCUIT

TECHNICAL FIELD

The present invention relates to a planar lightwave circuit applicable to various optical functional components.

BACKGROUND ART

In recent years, for optical communication, which has been developed as a high-speed and high-capacity telecommunication technology, various optical functional components including not only light-receiving and -emitting elements as active elements but also optical beam combiners as passive elements have been developed. Optical circuits using these kinds of optical functional components need to be small in size and inexpensive, and thus, such optical circuits are structured as silica-based planar lightwave circuits (PLCs) instead of free-space optical systems composed of bulk components.

In addition to the wavelength range for the telecommunications described above, an optical beam combiner circuit combines optical beams of the three primary colors, namely R (red light), G (green light), and B (blue light), when the optical beam combiner circuit is used for a visible light source of a glasses device or a small pico projector. For the wavelength range of visible light, applications of PLCs have been presented (refer to, for example, Non-Patent Literature 1 to 3).

PLCs are manufactured as follows: silica ($SiO_2$)-based glass is layered by flame hydrolysis deposition on a planar substrate made from, for example, Si to form a lower cladding layer; subsequently, a Ge-doped core layer is layered, and a desired optical waveguide circuit is formed by patterning with photolithography and reactive-ion etching; lastly, silica-based glass is layered as an upper cladding layer to cover the lower cladding layer and the core pattern, such that a PLC is finished. By using low-loss silica-based glass and micromachining technologies, PLCs can be applied to various optical functional components.

FIG. 1 illustrates a configuration of an RGB coupler using two directional couplers. An RGB coupler 100 using a PLC includes first to third input waveguides 101 to 103, first and second directional couplers 104 and 105, and an output waveguide 106 connected to the second input waveguide 102.

The waveguide length, waveguide width, and gap between waveguides of the first directional coupler 104 are designed to couple an optical beam of $\lambda 2$ entering from the first input waveguide 101 to the second input waveguide 102 and also couple an optical beam of $\lambda 1$ entering from the second input waveguide 102 to the first input waveguide 101 and back to the second input waveguide 102. The waveguide length, waveguide width, and gap between waveguides of the second directional coupler 105 are designed to couple an optical beam of $\lambda 3$ entering from the third input waveguide 103 to the second input waveguide 102 and also transmit the optical beam of $\lambda 1$ and optical beam of $\lambda 2$ coupled to the second input waveguide 102 by the first directional coupler 104.

For example, green light G (wavelength of $\lambda 2$) enters the first input waveguide 101, blue light B (wavelength of $\lambda 1$) enters the second input waveguide 102, and red light R (wavelength of $\lambda 3$) enters the third input waveguide 103; the light beams of the three colors R, G, and B are combined together by the first and second directional couplers 104 and 105 and output through the output waveguide 106. The wavelengths of $\lambda 1$, $\lambda 2$, and $\lambda 3$ are 450 nm, 520 nm, and 638 nm.

CITATION LIST

Non-Patent Literature

Non-Patent Literature 1: A. Nakao, R. Morimoto, Y. Kato, Y. Kakinoki, K. Ogawa and T. Katsuyama, "Integrated waveguide-type red-green-blue beam combiners for compact projection-type displays", Optics Communications 3 20 (2014) 45-48

Non-Patent Literature 2: Y. Hibino, "Arrayed-Waveguide-Grating Multi/Demultiplexers for Photonic Networks," IEEE CIRCUITS & DEVICES, November, 2000, pp. 21-27

Non-Patent Literature 3: A. Himeno, et al., "Silica-Based Planar Lightwave Circuits," J. Sel. Top. Q. E., vol. 4, 1998, pp. 913-924

SUMMARY OF THE INVENTION

Technical Problem

The PLC constituting the RGB coupler is formed by layering a glass film of a thickness of approximately 50 μm including core patterns of several micrometers square on a Si substrate of a thickness of 400 to 1000 μm. To further downsize optical functional components, there is a demand for thin Si substrates for optical beam combiner circuits used for visible light sources. Specifically, the desired thickness is about 200 μm or less. However, a problem is that as the thickness of a substrate decreases, the curve of the substrate increases.

Means for Solving the Problem

An object of the present invention is to provide a planar lightwave circuit in which stress on a substrate is reduced to decrease the curve of the substrate.

To achieve this object, in the present invention, a planar lightwave circuit according to one aspect is formed by layering a glass film on a substrate. When the optical axis direction from an input waveguide toward an output waveguide is in the longitudinal direction of the substrate, a plurality of grooves are formed in a line in the transverse direction of the substrate.

Effects of the Invention

In the present invention, the grooves are formed in the optical circuit structured on the substrate for the purpose of reducing stress on the substrate, and as a result, it is possible to decrease the curve of the substrate.

DESCRIPTION OF EMBODIMENTS

Hereinafter, embodiments of the present invention will be described in detail with reference to the drawings. Descriptions of the embodiments use an optical beam combiner circuit operable in the wavelength range of visible light as an example, but the present invention can be applied to various optical functional components using planar lightwave circuits (PLCs).

First Embodiment

Figure 2:
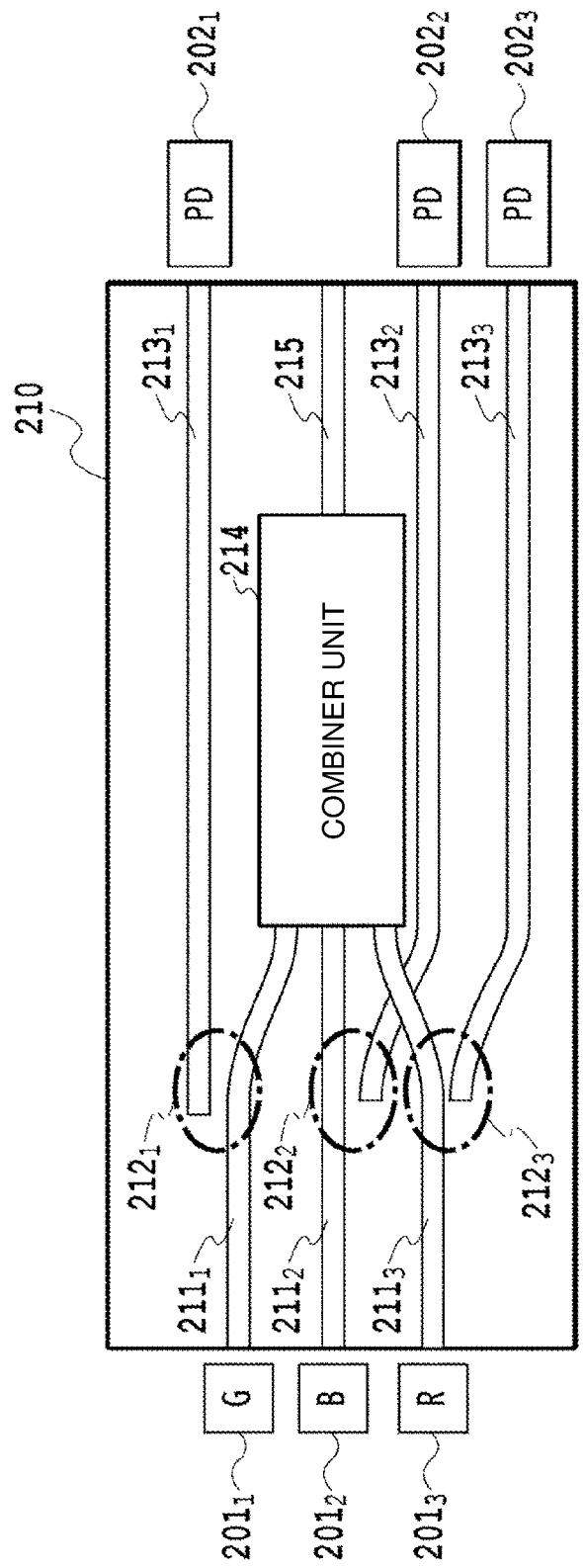
FIG. 2 illustrates a light source having a monitoring function according to a first embodiment of the present invention.

FIG. 2 illustrates a light source having a monitoring function according to a first practical example of a first embodiment of the present invention. The light source having a monitoring function includes first to third laser diodes (LDs) $201_1$ to $201_3$ configured to output optical beams of the respective colors R (red light), G (green light), and B (blue light), and a planar lightwave circuit (PLC)-type RGB coupler 210, and first to third photodiodes (PDs) $202_1$ to $202_3$ optically connected to the RGB coupler 210.

The PLC-type RGB coupler 210 includes first to third input waveguides $211_1$ to $211_3$, first to third branch portions $212_1$ to $212_3$, a combiner unit 214, first to third monitoring waveguides $213_1$ to $213_3$, and an output waveguide 215. The first to third input waveguides $211_1$ to $211_3$ are optically connected to the first to third LDs $201_1$ to $201_3$. The first to third branch portions $212_1$ to $212_3$ divide an optical beam propagating along a corresponding waveguide into two. The combiner unit 214 combines optical beams that are one of the divided optical beams divided by each of the first to third branch portions $212_1$ to $212_3$. The first to third monitoring waveguides $213_1$ to $213_3$ output the other of the optical beams divided by the respective first to third branch portions $212_1$ to $212_3$ to the first to third PDs $202_1$ to $202_3$. The output waveguide 215 outputs a combined optical beam obtained by the combiner unit 214.

In the PLC-type RGB coupler 210, optical beams enter the first to third input waveguides $211_1$ to $211_3$, and the first to third branch portions $212_1$ to $212_3$ divides the respective optical beams into two. One of the divided optical beams is output to a corresponding one of the first to third PDs $202_1$ to $202_3$ through a corresponding one of the first to third monitoring waveguides $213_1$ to $213_3$. The others of the divided optical beams are combined together by the combiner unit 214 and output to the output waveguide 215.

Figure 1:
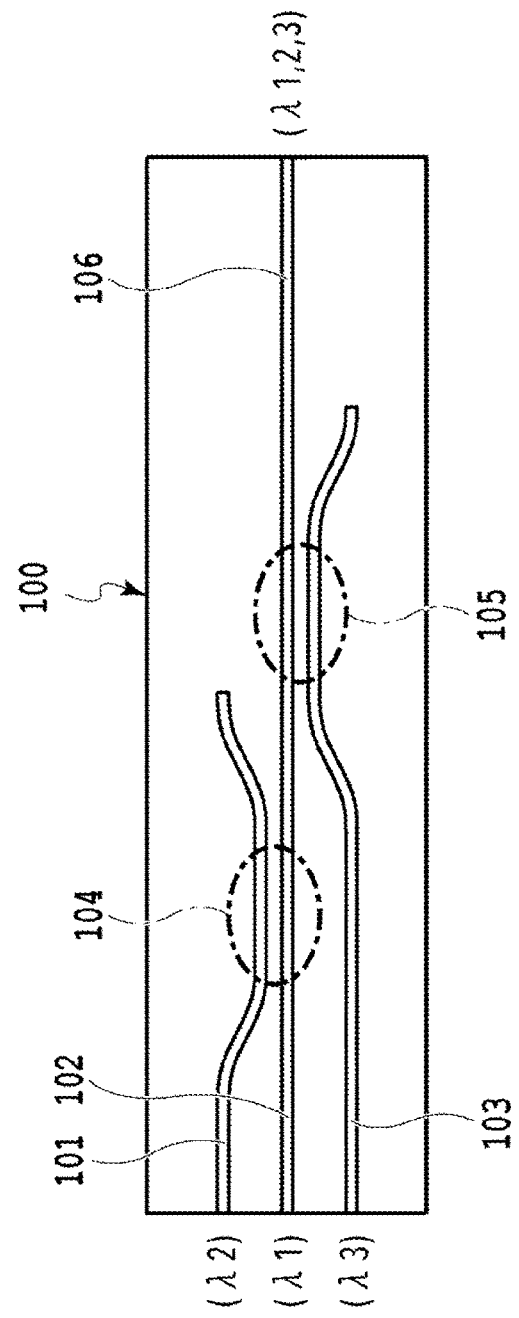
FIG. 1 illustrates a configuration of a known RGB coupler using two directional couplers.

The combiner unit 214 can be implemented as an optical beam combiner circuit using the directional coupler illustrated in FIG. 1. In this case, the first to third input waveguides $211_1$ to $211_3$ are respectively coupled to the first to third input waveguides 101 to 103 illustrated in FIG. 1; the output waveguide 215 is coupled to the output waveguide 106 illustrated in FIG. 1. The combiner unit 214 is not limited to this example and may be implemented by using different combiner means with waveguides (for example, a Mach-Zehnder interferometer or a mode coupler).

When optical beams propagating along the first to third input waveguides $211_1$ to $211_3$ are divided by the first to third branch portions $212_1$ to $212_3$ as illustrated in FIG. 2, it is possible to monitor the coupling characteristic between the first to third LDs $201_1$ to $201_3$ and the first to third input waveguides $211_1$ to $211_3$. In addition, by previously determining the multiplexing characteristic of the combiner unit 214, it is possible to adjust white balance of the light source in accordance with monitor values obtained by using the first to third PDs $202_1$ to $202_3$.

Second Embodiment

Figure 3:
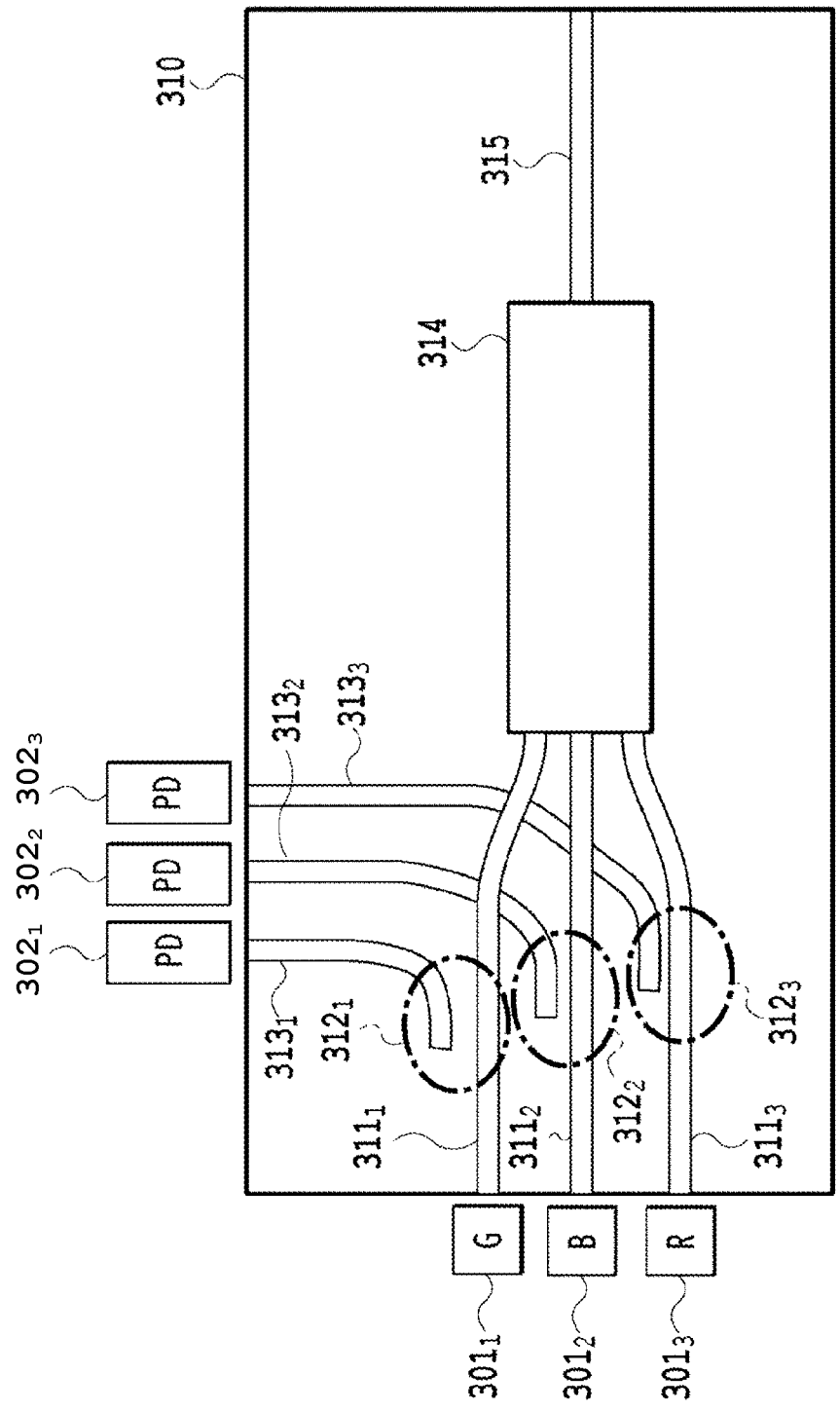
FIG. 3 illustrates a light source having a monitoring function according to a second embodiment of the present invention.

FIG. 3 illustrates a light source having a monitoring function according to a second embodiment of the present invention. Since the first embodiment can monitor optical beams of the colors R, G, and B, when, for example, the deviation from designed values of the RGB coupler differs between the shorter wavelength (B) and the longer wavelength (R) due to manufacturing errors, feedback control can be performed for the individual colors, and as a result, it is possible to precisely adjust white balance. However, when the PD 202 is positioned facing a light emitting surface of the LD 201, stray light may enter the PD 202, and as a result, accurate monitor values may be not necessarily obtained. Examples of the stray light include an optical beam leaking into the RGB coupler 210 because the output from the LD 201 cannot be coupled to the input waveguide 211, an optical beam leaking from the combiner unit 214 or having failed to be combined with other optical beams by the combiner unit 214, and an optical beam leaking into the RGB coupler 210 through a dump port of the combiner unit 214.

In consideration of this, in the second embodiment, not to position an LD 301 and a PD 302 to face each other, first to third monitoring waveguides $313_1$ to $313_3$ are formed as bent waveguides for changing the optical path by 90°. Since the direction in which the LD 301 emits an optical beam and the direction in which a combiner unit 314 outputs an optical beam are substantially perpendicular to the direction in which an optical beam enters the PD 302, the PD 302 can avoid incident stray light.

A PLC-type RGB coupler 310 includes first to third input waveguides $311_1$ to $311_3$, first to third branch portions $312_1$ to $312_3$, a combiner unit 314, the first to third monitoring waveguides $313_1$ to $313_3$, and an output waveguide 315. The first to third input waveguides $311_1$ to $311_3$ are optically connected to the first to third LDs $301_1$ to $301_3$. The first to third branch portions $312_1$ to $312_3$ divide an optical beam propagating along a corresponding waveguide into two. The combiner unit 314 combines optical beams that are one of the divided optical beams divided by each of the first to third branch portions $312_1$ to $312_3$. The first to third monitoring waveguides $313_1$ to $313_3$ output the other of the optical beams divided by the respective first to third branch portions $312_1$ to $312_3$ to the first to third PDs $302_1$ to $302_3$. The output waveguide 315 outputs a combined optical beam obtained by the combiner unit 214.

Third Embodiment

The light source having a monitoring function described above is constituted by the branch portions configured to route optical beams to the monitoring waveguides in a divided manner and the combiner unit configured to combine optical beams of the colors R, G, and B and composed of directional couplers. The length of the RGB coupler from the input waveguides to the output waveguide in the optical axis direction is thus relatively long, and consequently, the curve in the optical axis direction tends to be relatively large.

To reduce the curve of the PLC, grooves are formed to reduce stress on the substrate.

Figure 4:
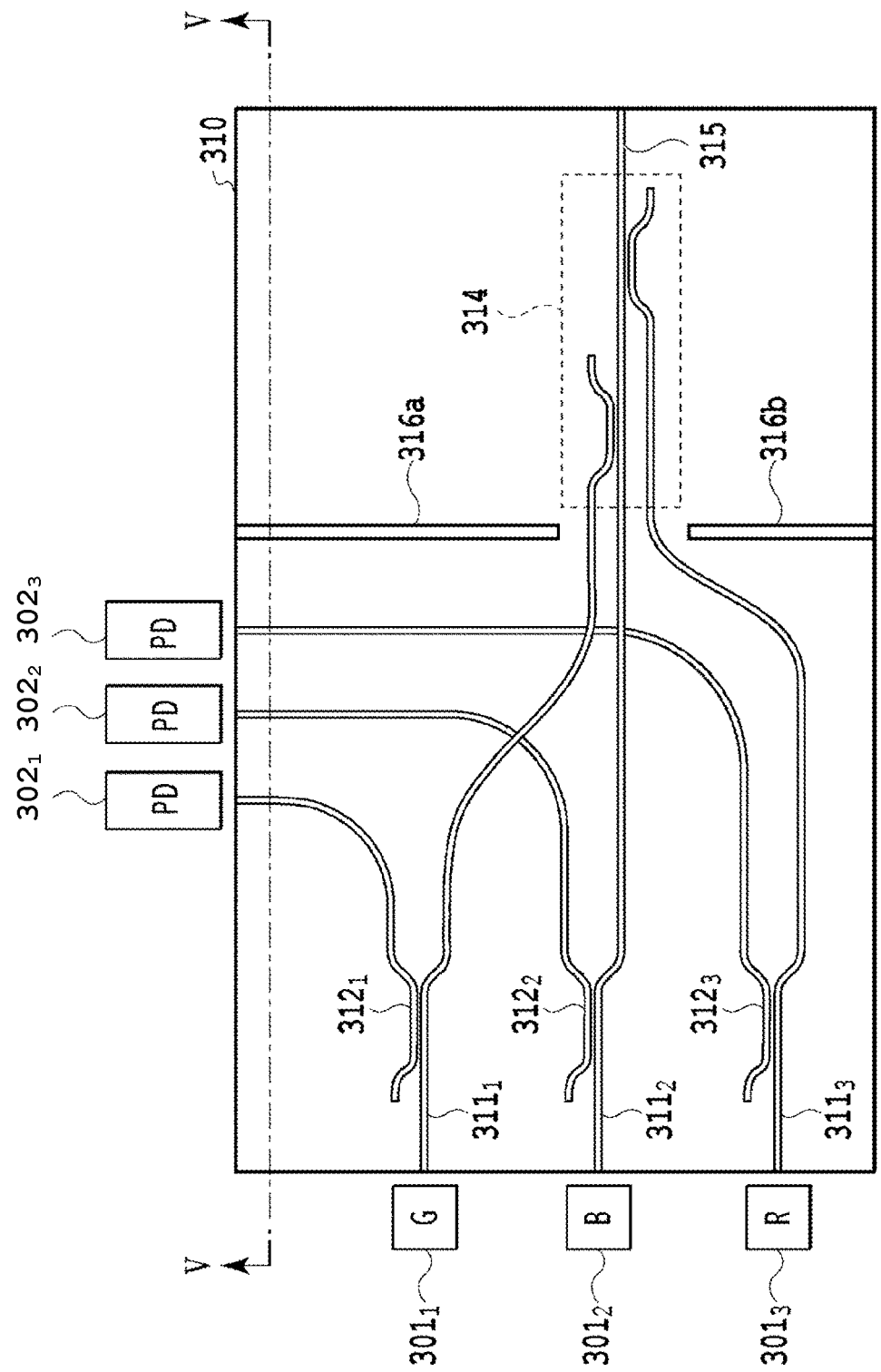
FIG. 4 illustrates a light source having a monitoring function according to a third embodiment of the present invention.

FIG. 4 illustrates a light source having a monitoring function according to a third embodiment of the present invention. The structure of the light source having a monitoring function is identical to the structure of the second embodiment. The illustration of the RGB coupler 310 is modified approximately in proportion to the ratio of the size of the actual waveguides and the size of the optical functional circuit.

Stress relaxation grooves 316a and 316b are provided at a center part in the optical axis direction from the input waveguides 311 toward the output waveguide 315, that is, the longitudinal direction of the substrate. The stress relaxation grooves 316a and 316b are positioned in the direction perpendicular to the optical axis (transverse direction of the substrate). Since the stress relaxation groove 316 is provided for the purpose of decreasing the curve of the substrate in the longitudinal direction, it is desirable that the stress relaxation grooves 316 be elongated to cover the entire width of the substrate in the transverse direction. However, it is necessary to avoid the circuit elements such as the optical waveguides, and hence, a plurality of the stress relaxation grooves 316 are separately provided. In this case, the stress relaxation grooves 316 are elongated as long as possible in a line. Furthermore, it is preferable that the grooves reach both end surfaces of the substrate in the transverse direction. In the third embodiment, a pair of two divided grooves are formed in a line in the transverse direction of the substrate, but multiple pairs may be provided in accordance with the circuit configuration.

Figure 5:
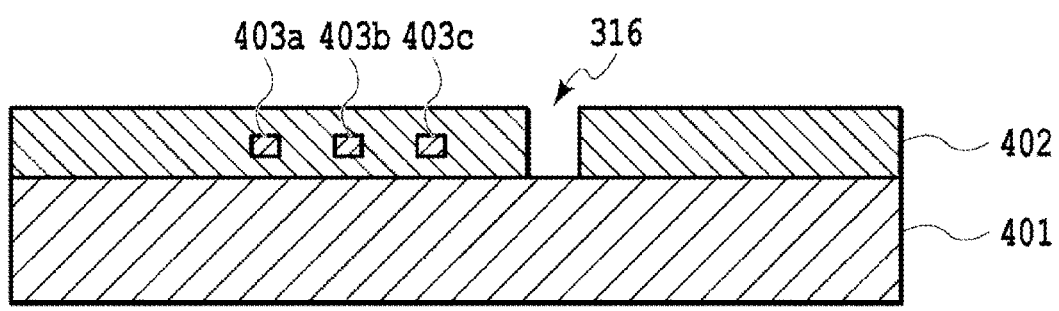
FIG. 5 is a sectional view of an RGB coupler according to the third embodiment.

FIG. 5 is a sectional view of the RGB coupler 310 according to the third embodiment. An Si substrate 401 is overlaid with a glass film 402. In the glass film 402, buried waveguides with cores 403a to 403c form an optical beam combiner circuit. The Si substrate 401 is as thin as 200 μm; the glass film 402 is 50 μm in thickness. The stress relaxation groove 316 is formed to reach the Si substrate 401 by removing the glass film 402 by patterning with photolithography or the like and etching.

The depth of the stress relaxation groove 316 is the depth of the removed glass film 402. However, since the effect of decreasing the curve increases in proportion to the width, the Si substrate 401 may be partially removed for an additional depth. In so far as necessary effects of reducing the curve are achieved, the depth of the stress relaxation groove 316 may be the depth of a partially removed glass film 402.

Figure 6:
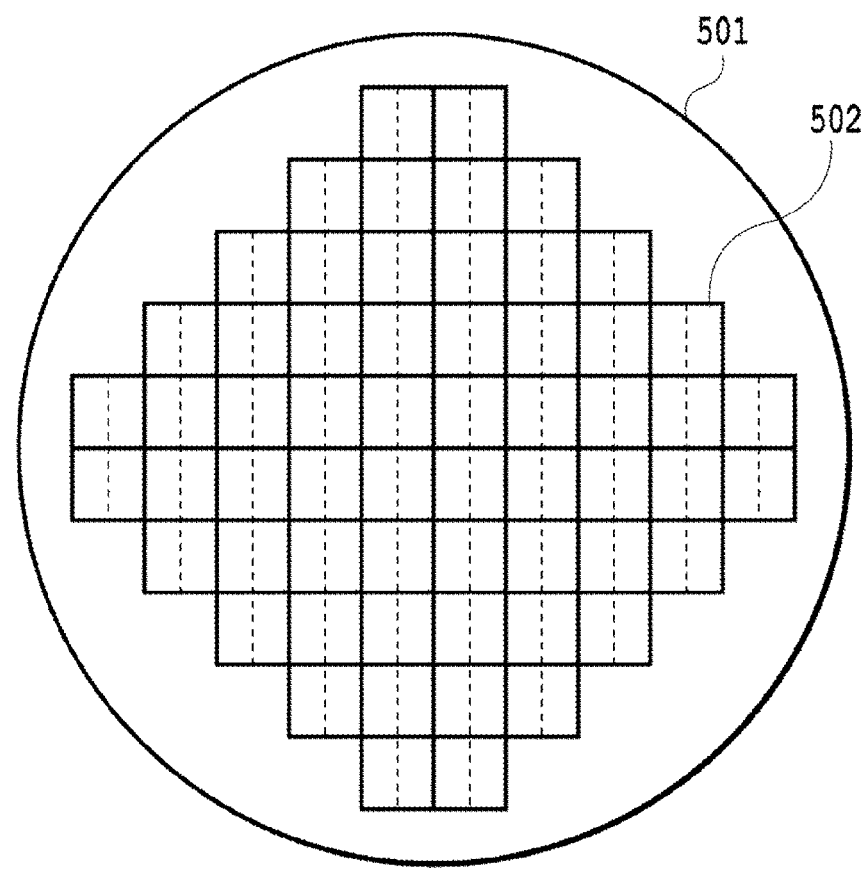
FIG. 6 illustrates a method of forming grooves in the RGB coupler of the third embodiment.

FIG. 6 illustrates a method of forming grooves in the RGB coupler of the present embodiment. When an optical functional component constituted by a PLC is manufactured, a plurality of optical functional components are usually formed together on a wafer. At this time, after a plurality of RGB couplers 502 are formed on a wafer 501, the stress relaxation grooves 316 (lines indicated by dots in FIG. 5) are together formed as illustrated in FIG. 5. By forming grooves on the wafer 501, stress relaxation grooves can be contiguously formed to reach both end surfaces of the substrate of a corresponding RGB coupler in the transverse direction.

(Other Practical Examples)

While the descriptions have been made by using an optical beam combiner circuit using directional couplers as an example, the same effects can be achieved when the present invention is applied to a planar lightwave circuit including a substrate with a relatively large difference between the longitudinal direction and the transverse direction, such as an optical filter using a cascaded Mach-Zehnder interferometer. When the present invention is applied to a planar lightwave circuit including a relatively large substrate with a relatively small difference between the longitudinal direction and the transverse direction, such as an optical combiner and splitter using an arrayed waveguide grating, stress relaxation grooves may be provided in both the longitudinal direction and the transverse direction.

REFERENCE SIGNS LIST 100, 210, 310 RGB coupler
101-103, 211, 311 Input waveguide
104, 105 Directional coupler
106, 215, 315 Output waveguide
201, 301 LD
202, 302 Photodiode (PD)
212, 312 Branch portion
213, 313 Monitoring waveguide
214, 314 Combiner unit
316 Stress relaxation groove
401 Substrate
402 Cladding
403 Core

The invention claimed is:

1. A planar lightwave circuit formed by:
layering a glass film on a substrate;
forming a plurality of input waveguides;
forming an output waveguide that is coupled to the plurality of input waveguides; and
forming a plurality of grooves in a line in central part of the substrate between the plurality of input waveguides and the output waveguide.

2. The planar lightwave circuit according to claim 1, wherein the plurality of grooves are formed by removing the glass film, and the plurality of grooves reach the substrate.

3. The planar lightwave circuit according to claim 2, wherein two grooves of the plurality of grooves respectively reach end surfaces on both sides of the substrate.

4. The planar lightwave circuit according to claim 2, wherein the plurality of grooves formed in a line constitute a group, and a plurality of the groups are formed.

5. The planar lightwave circuit according to claim 1, wherein two grooves of the plurality of grooves respectively reach end surfaces on both sides of the substrate.

6. The planar lightwave circuit according to claim 5, wherein the plurality of grooves formed in a line constitute a group, and a plurality of the groups are formed.

7. The planar lightwave circuit according to claim 1, wherein the plurality of grooves formed in a line constitute a group, and a plurality of the groups are formed.

* * * * *